United States Patent [19]

Adachi et al.

[11] Patent Number: 4,985,317

[45] Date of Patent: Jan. 15, 1991

[54] LITHIUM ION-CONDUCTIVE SOLID ELECTROLYTE CONTAINING LITHIUM TITANIUM PHOSPHATE

[75] Inventors: Ginya Adachi, Kobe; Nobuhito Imanaka, Toyonaka; Hiromichi Aono, Niihama; Eisuke Sugimoto, Niihama; Yoshihiko Sadaoka, Matsuyama; Naoshi Yasuda, Yokohama; Takeo Hara, Yokohama; Masaki Nagata, Yokohama, all of Japan

[73] Assignee: Japan Synthetic Rubber Co., Ltd., Tokyo, Japan

[21] Appl. No.: 372,075

[22] Filed: Jun. 28, 1989

[30] Foreign Application Priority Data

Nov. 30, 1988 [JP] Japan .............................. 63-302539
Nov. 30, 1988 [JP] Japan .............................. 63-302540
Dec. 14, 1988 [JP] Japan .............................. 63-315800
Mar. 9, 1989 [JP] Japan .............................. 1-57367

[51] Int. Cl.$^5$ ................................ H01M 6/18
[52] U.S. Cl. ........................................... 429/191
[58] Field of Search .............. 429/191, 30, 32, 33, 429/193; 252/62.2, 520; 423/299, 324, 327, 332

[56] References Cited

U.S. PATENT DOCUMENTS

| | | | |
|---|---|---|---|
| 4,042,482 | 8/1977 | Shannon et al. | 429/191 X |
| 4,166,159 | 8/1979 | Pober | 429/193 |
| 4,390,460 | 6/1983 | Miyauchi et al. | 252/518 |
| 4,512,905 | 4/1985 | Clearfield et al. | 429/191 X |
| 4,810,599 | 3/1989 | Kondo et al. | 429/191 |
| 4,828,945 | 5/1989 | Nagata et al. | 429/191 |

Primary Examiner—Anthony Skapars
Attorney, Agent, or Firm—Spencer & Frank

[57] ABSTRACT

A lithium ion-conductive solid electrolyte consisting of a compound represented by the chemical formula, $Li_{1+x}M_xTi_{2-x}(PO_4)_3$ (M is at least one element selected from the group consisting of Fe, Al and rare earth elements and x is a number of 0.1 to 1.9), a compound represented by the chemical formula, $Li_{1+y}Ti_2Si_yP_{3-y}O_{12}$ (Y is a number of 0.1 to 2.9), or a compound obtained by mixing a compound represented by the chemical formula, $LiTi_2(PO_4)_3$ with a lithium compound other than $LiTi_2(PO_4)_3$ and sintering the resulting mixture. Said lithium ion-conductive solid electrolyte can be produced by subjecting to solid phase reaction a mixture of a titanium oxide, a lithium salt, a phosphoric salt and $M_2O_3$ (M is at least one element selected from the group consisting of Fe, Al and rare earth elements) or a silicon oxide or a mixture of $LiTi_2(PO_4)_3$ and other lithium compound. Said lithium ion-conductive electrolyte can be used in the form of a lithium ion-conductive electrolyte sheet to prepare a structure suitable for solid electrochemical elements.

6 Claims, 3 Drawing Sheets

LITHIUM ION-CONDUCTIVE SOLID ELECTROLYTE CONTAINING LITHIUM TITANIUM PHOSPHATE

BACKGROUND OF THE INVENTION

1. Field of the Invention

This invention relates to a lithium ion-conductive solid electrolyte, a process for the production thereof, a sheet of the solid electrolyte, and a structure in which the solid electrolyte sheet is used. More particularly, this invention relates to a novel lithium ion-conductive solid electrolyte having a high lithium ion-conductivity at room temperature and suitable for use in solid electrochemical devices such as solid microcell and the like, a process for the production thereof, a sheet of the solid electrolyte, and a structure in which the solid electrolyte sheet is used.

2. Discussion of the Background

The technical progress in electronic industry in recent years is remarkable and electronic components such as IC, LSI and the like are much used in almost all fields. Such technical progress is also seen in the field of cell technique and an attempt has been made to render cells smaller and thinner. Such cells are used in large amounts as a power source for card-shaped portable calculator, camera, wrist watch, etc.

Most of the cells used in the above applications are alkali cells or lithium cells, and a liquid electrolyte is used therein. These cells in which a liquid electrolyte is used require highly efficient sealing and the current sealing technique mainly employed is a crimp seal with a gasket. In this sealing technique, however, the thinner the cells, the larger the proportion of the sealing material occupying the cell volume, which makes it difficult to provide the required cell capacity. Therefore, there is a limitation in making cells thinner.

Under such circumstances, research is being conducted on solid electrolytes having a high lithium ion-conductivity in order to make cells smaller and thinner.

As such a solid electrolyte, polymer solid electrolytes have been tested and a typical example thereof is a poly(oligooxyethylene methacrylate)-alkali metal salt system. However, the ion-conductivity thereof is at best about $10^5$ S/cm at room temperature and moreover this system is inferior in selectivity of movable ions and causes the movement of not only cations (e.g. $Li^+$) but also anions (e.g. $ClO_4^-$). Therefore, polymer solid electrolytes have not been used in practice.

Vigorous research is also being conducted on powders of inorganic solid electrolytes such as lithium halides; mixtures of a lithium halide with aluminum oxide; lithium nitride; lithium nitride derivatives; oxyacid salts of lithium having a $\gamma_{II}$-$Li_3PO_4$-type structure; and the like. However, lithium halides and mixtures of a lithium halide with aluminum oxide have inferior chemical stability and a low conductivity $\sigma$ of $10^{-6}$–$10^{-7}$ S/cm. Lithium nitride and its derivatives have a high conductivity $\sigma$ of about $10^{-3}$ S/cm but poor chemical stability. The oxyacid salts of lithium having a $\gamma_{II}$-$Li_3PO_4$ type structure have excellent chemical stability but a low conductivity $\sigma$ of about $10^{-5}$ S/cm. Therefore, the application of these inorganic solid electrolytes to various fields is difficult.

Furthermore, the inorganic solid electrolytes are powdery, and hence, require pelletization at high pressures when they are formed into cells or the like. This is a great obstacle in achieving high productivity, uniformity, etc. Moreover, the pellets obtained are hard and brittle, and therefore, there is a limit to cell thinness and it is difficult to produce a cell having a large surface area. Also, in the application of the inorganic solid electrolyte to cells, it is necessary to apply a great pressure to intimately contact the solid electrolyte with an electrode active substance when adhering the two to each other. Therefore, workability, adhesion, etc. are varied. When the adhesion between the inorganic solid electrolyte and electrode active substance is made in a large area, no uniform adhesion is obtained and the electrolyte pellets are broken.

SUMMARY OF THE INVENTION

An object of this invention is to provide a novel lithium ion-conductive solid electrolyte which has solved the above-mentioned problems of the prior art, which has a high conductivity and a high lithium ion transport number at room temperature, and which is chemically stable, and to provide a process for the production thereof.

Another object of this invention is to provide a sheet of the above lithium ion-conductive solid electrolyte, which enables the production of a solid cell characterized by having excellent processability, excellent productivity, excellent storage stability, excellent flexibility, excellent adhesion to an electrode active substance, and enables cells to be made thinner and to have a large area, high energy density, low self-discharge and the like.

A still further object of this invention is to provide a structure in which said solid electrolyte sheet is used.

Other objects and advantages of this invention will become apparent from the following description.

According to this invention, there is provided a lithium ion-conductive solid electrolyte consisting of:

- a compound represented by the chemical formula, $Li_{1+x}M_xTi_{2-x}(PO_4)_3$, where M is at least one element selected from the group consisting of Fe, Al and rare earth elements and x is a number of 0.1 to 1.9,
- a compound represented by the chemical formula, $Li_{1+y}Ti_2Si_yP_{3-y}O_{12}$, where y is a number of 0.1 to 2.9, or
- a compound obtained by mixing a compound represented by the chemical formula, $LiTi_2(PO_4)_3$ with a lithium compound other than the lithium compound of $LiTi_2(PO_4)_3$ and sintering the resulting mixture.

This invention further provides a process for producing a lithium ion-conductive solid electrolyte consisting of a compound represented by the chemical formula, $Li_{1+x}M_xTi_{2-x}(PO_4)_3$ where M and x are as defined above, which comprises mixing a titanium oxide, a lithium salt, a phosphoric acid salt and $M_2O_3$ and then heating the resulting mixture to effect a solid-phase reaction, or a process for producing a lithium ion-conductive solid electrolyte consisting of a compound represented by the chemical formula, $Li_{1+y}Ti_2Si_yP_{3-y}O_{12}$ where y is as defined above, which comprises mixing a titanium oxide, a lithium salt, a phosphoric acid salt and a silicon oxide and then heating the resulting mixture to effect a solid-phase reaction.

This invention still further provides a lithium ion-conductive solid electrolyte sheet consisting essentially of (a) a solid electrolyte powder containing a lithium titanium phosphate uniformly dispersed in (b) an insulating elastomer in a volume fraction of 55-95%.

This invention further provides a structure consisting essentially of (i) an electrolyte sheet, in which a solid electrolyte powder containing a lithium titanium phosphate is dispersed in an insulating elastomer in a volume fraction of 55-95% and (ii) a pair of electrode sheets, a pair of metal sheets or an electrode sheet and a metal sheet, said electrolyte sheet (i) being sandwiched in between the sheets (ii), and each of said electrode sheet consisting of a mixture of an electrode active substance powder with an inorganic solid electrolyte powder dispersed in an insulating elastomer in a volume fraction of 50-95%.

DESCRIPTION OF PREFERRED EMBODIMENTS OF THE INVENTION

Figure 1:
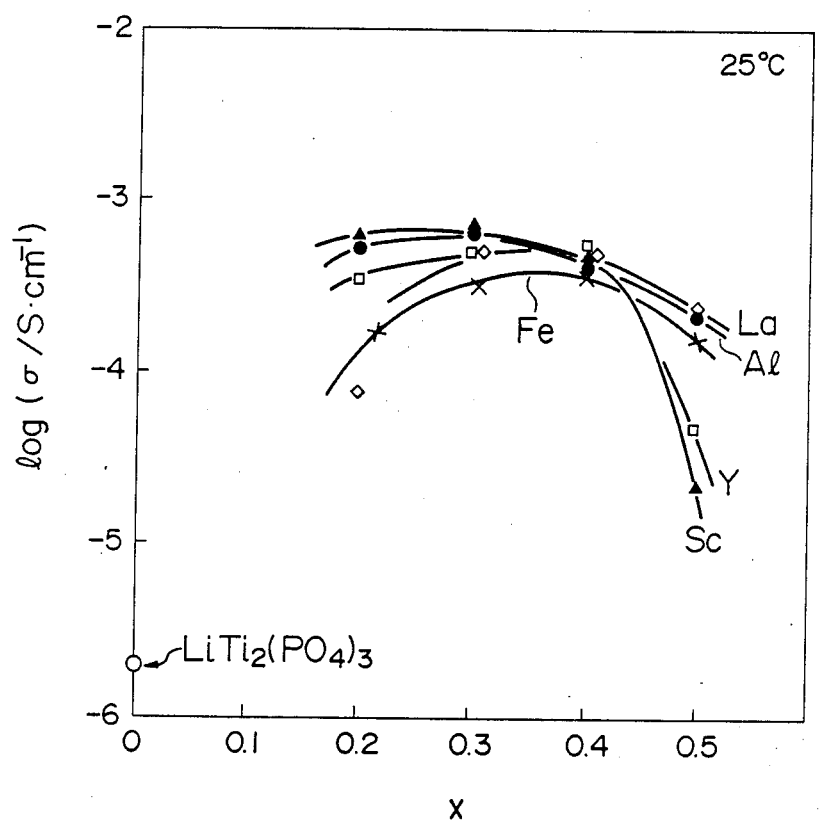
FIG. 1 is a graph showing the relationships between substitution amount x and ion-conductivity $\sigma$, in the lithium ion-conductive solid electrolyte of this invention represented by the chemical formula, $Li_{1+x}M_xTi_{2-x}(PO_4)_3$.

In the lithium ion-conductive solid electrolyte represented by the chemical formula, $Li_{1+x}M_xTi_{2-x}(PO_4)_3$ (referred to hereinafter as "Solid Electrolyte I"), M is at least one element selected from the group consisting of Al, Fe and rare earth elements such as Sc, Y, La and the like, and x is a number of 0.1 to 1.9, preferably 0.2 to 0.5, and more preferably 0.2 to 0.4. When x is smaller than 0.1 or larger than 1.9, it is difficult to obtain a satisfactory conductivity.

The Solid Electrolyte I of this invention can be produced by mixing a titanium oxide (e.g. $TiO_2$), a lithium salt (e.g. $Li_2CO_3$, $Li_2O$ or the like), a phosphoric acid salt [e.g. $(NH_4)_2HPO_4$, $(NH_4)H_2PO_4$ or the like] and $M_2O_3$ [M is at least one element selected from the group consisting of Al, Fe and rare earth elements (e.g. Sc, Y, La and the like)] and then heating the resulting mixture to effect solid-phase reaction.

The titanium oxide, lithium salt, phosphoric acid salt and $M_2O_3$, which are the raw materials for preparing the Solid Electrolyte I, may be commercial products per se, but it is preferable to use those obtained by subjecting the commercial products to purification followed by vacuum drying.

The method of mixing these raw materials is not critical and the mixing is effected, for example, by weighing the necessary amounts of the raw materials each in the powder form and mixing them using a mortar or the like.

The preferable proportions of the raw materials used are titanium oxide/lithium salt/phosphoric acid salt/$M_2O_3$ = 20-30/10-17/55/1-8 (mole %) (100 mole % in total).

The heating of the resulting mixture to effect solid-phase reaction can be conducted, for example, by heating the mixture in an electric furnace in air or an inert gas at a temperature of 900°-1,200° C. for 1-10 hours. After the solid-phase reaction, the resulting solid-phase reaction product may be, if necessary, subjected to grinding. This grinding is preferably effected for about 5-15 hours on a ball mill or the like. The heating to effect the solid-phase reaction and the grinding of the resulting solid-phase reaction product are usually conducted at least once, and preferably repeated several times in order to allow the solid-phase reaction to proceed sufficiently.

The ground solid-phase reaction product is, if necessary, subjected to pressure molding and then to sintering.

The method of the pressure molding is not critical and the pressure molding can be effected, for example, at a pressure of at least 1 t/cm$^2$ using a press or the like. In this case, in order to increase the moldability, it is possible to add a binder (e.g. polyvinyl alcohol) or a molding aid.

The method of sintering the pressure-molded product is not critical and can be effected, for example, by heating the product in an electric furnace in air or an inert gas at a temperature of 850°-1,300° C. for about 1-5 hours.

In the lithium ion-conductive solid electrolyte represented by the chemical formula, $Li_{1+y}Ti_2Si_yP_{3-y}O_{12}$ (referred to hereinafter referred to as "Solid Electrolyte II"), y is a number from 0.1-2.9, preferably 0.2-0.5, and more preferably 0.3-0.4. When y is smaller than 0.1 or larger than 2.9, it is difficult to obtain a satisfactory conductivity.

The titanium oxide (e.g. $TiO_2$), lithium salt (e.g. $Li_2CO_3$, $Li_2O$ or the like), phosphoric acid salt [e.g. $(NH_4)_2HPO_4$, $(NH_4)H_2PO_4$ or the like] and silicon oxide (e.g. $SiO_2$), which are the raw materials for preparing the Solid Electrolyte II, may be commercial products per se, and preferably those obtained by subjecting the commercial products to purification followed by vacuum drying.

The method of mixing these raw materials is not critical and the mixing is effected, for example, by weighing the necessary amounts of the raw materials each in the powder form and mixing them using a mortar or the like. The resulting mixture is heated to effect solid-phase reaction, whereby the Solid Electrolyte II can be produced.

The preferable proportions of the raw materials used are titanium oxide/lithium salt/phosphoric acid salt/silicon oxide = 34-36/10-13/43-50/3-9 (mole %) (100 mole % in total).

The heating of the mixture to effect solid-phase reaction can be effected in the same manner as in the production of the Solid Electrolyte I. The grinding, pressure molding and sintering which may be, if necessary, applied to the solid-phase reaction product, can also be effected in the same manner as in the production of the Solid Electrolyte I.

In the lithium ion-conductive solid electrolyte consisting of a compound obtained by mixing a compound represented by the chemical formula, $LiTi_2(PO_4)_3$ with a lithium compound other than $LiTi_2(PO_4)_3$ (the other lithium compound is referred to hereinafter as "lithium compound A") and sintering the resulting mixture (the solid electrolyte is referred to hereinafter as "Solid Electrolyte III"), $LiTi_2(PO_4)_3$ can be obtained by mixing a titanium oxide (e.g. $TiO_2$), a lithium salt (e.g. $Li_2CO_3$, $Li_2O$ or the like) and a phosphoric acid salt [e.g. $(NH_4)_2HPO_4$, $(NH_4)H_2PO$ or the like] and then heating the resulting mixture to effect solid-phase reaction.

The titanium oxide, lithium salt and phosphoric acid salt, which are the raw materials for preparing $LiTi_2(PO_4)_3$, may be commercial products per se, and preferably those obtained by subjecting the commercial products to purification followed by vacuum drying. The method of mixing these raw materials is not critical and the mixing is effected, for example, by weighing the necessary amounts of the raw materials each in powder form and mixing them using a mortar or the like.

The preferable proportions of the raw materials used are titanium oxide/lithium salt/phosphoric acid salt= 35-37/8-10/53-55 (mole %) (100 mole % in total).

The heating of the mixture to effect the solid-phase reaction can be effected in the same manner as in the production of the Solid Electrolyte I.

Next, the powder of the compound represented by $LiTi_2(PO_4)_3$ obtained by the solid-phase reaction is mixed with lithium compound A, for example, a powder of a lithium oxide, lithium phosphate or the like, and the resulting mixture may be, if necessary, subjected to pressure molding and then to sintering.

The lithium compound A also may be a commercial product per se in the powder form, and preferably that obtained by subjecting the commercial product to vacuum drying.

The proportion of lithium compound A used is usually 0.05-5 moles, preferably 0.1-3 moles, more preferably 0.1-0.3 moles, per mole of the compound represented by $LiTi_2(PO_4)_3$.

The pressure molding and the subsequent sintering which may be, if necessary, applied, can be effected in the same manner as in the production of the Solid Electrolyte I.

The lithium compound A may be added at the stage of mixing the raw materials for preparing $LiTi_2(PO_4)_3$. For example, lithium compound A, or a lithium salt yielding lithium compound A upon heating, is mixed with the raw materials for preparing $LiTi_2(PO_4)_3$, whereby the synthesis of $LiTi_2(PO_4)_3$ and lithium compound A and their mixing can be effected simultaneously.

$Li_2CO_3$, $Li_2HPO_4$, $LiH_2PO_4$, etc. are examples of the lithium salt yielding lithium compound A upon heating. The lithium salt yielding lithium compound A upon heating is added to the raw materials for preparing $LiTi_2(PO_4)_3$ in such an amount that the proportion of lithium compound A after heating is usually 0.05-5 moles, and preferably 0.1-3 moles, more preferably 0.1-0.3 mole, per mole of $LiTi_2(PO_4)_3$.

The heating of the above mixture to effect solid-phase reaction can also be effected in the same manner as in the production of the Solid Electrolyte I.

Each of Solid Electrolytes I, II and III is ground to a solid electrolyte powder (referred to hereinafter as "specific solid electrolyte powder"), and the powder is mixed with and uniformly dispersed in an insulating elastomer, after which the resulting mixture is molded into a sheet, thereby obtaining a solid electrolyte sheet (referred to hereinafter as "SE sheet").

The SE sheet can be prepared using a solid electrolyte powder other than Solid Electrolytes I, II and III of this invention (this other solid electrolyte powder is referred to hereinafter as "other solid electrolyte powder") along with the specific solid electrolyte powder (hereinafter, the specific solid electrolyte powder and the other solid electrolyte powder are referred to collectively as "solid electrolyte powder"). As the other solid electrolyte powder, ion-conductive solid electrolytes can be used, for example, $Li^+$ ion-conductive solid electrolytes such as LiI, $LiI.H_2O$, $Li_3N$, $Li_4SiO_4$-$Li_3PO_4$ and the like; $Ag^+$ ion-conductive solid electrolytes such as $RbAg_4I_5$, $KAg_4I_5$, $Ag_3SI$, $AgI$-$Ag_2O$-$MoO_3$ glass and the like; $Cu^+$ ion-conductive solid electrolytes such as $RbCu_4I_{2-x}Cl_{3+x}$ (x is a number of 0.2-0.6), $CuI$-$Cu_2O$-$MoO_3$ glass, $CuI$-$Cu_2O$-$P_2O_5$ glass and the like; $H^+$ ion-conductive solid electrolytes such as $H_3Mo_{12}PO_{40}.29H_2O$, $H_3W_{12}PO_{40}.29H_2O$ and the like; $Na^+$ ion-conductive solid electrolytes such as Na-$\beta$-$Al_2O_3$, $Na_{1+a}Zr_2P_{3-a}Si_aO_{12}$ (a is a number of 0-3) and the like.

The shape and particle diameter of the solid electrolyte powder are not critical, in view of the miscibility with the insulating elastomer and a solid electrolyte powder which can pass through a 100-200 mesh (Tyler) screen, is preferred.

The insulating elastomer used in the production of the SE sheet includes, for example, 1,4-polybutadiene, natural rubber, polyisoprene, styrene-butadiene rubber, acrylonitrile-butadiene rubber, ethylene-propylene copolymer, ethylene-propylene-diene terpolymer, urethane rubber, polyester rubber, chloroprene rubber, epichlorohydrin rubber, silicone rubber, styrene-butadiene-styrene block copolymer (hereinafter referred to as "SBS"), styrene-isoprene-styrene block copolymer, styrene-ethylene-butylene-styrene block copolymer (hereinafter referred to as "SEBS"), styrene-ethylene-propylene block copolymer (hereinafter referred to as "SEP"), butyl rubber, phosphazene rubber, polyethylene, polypropylene, poly(ethylene oxide), poly(propylene oxide), polystyrene, poly(vinyl chloride), ethylene-vinyl acetate copolymer, 1,2-polybutadiene, epoxy resin, phenolic resin, cyclized polybutadiene, cyclized polyisoprene, poly(methyl methacrylate) and mixtures thereof.

The insulating elastomer preferably has an ASTM hardness of 90 or less in view of the flexibility. In order for the resulting SE sheet to have good properties over a wide temperature range, it is preferable that the insulating elastomer has a brittle temperature of $-40°$ C. or below and a heat stability of $80°$ C. or above.

In the SE sheet, the volume fraction of the solid electrolyte powder is 55-95%, and preferably 75-92%. When the volume fraction of the solid electrolyte powder is less than 55%, the resulting SE sheet tends to have a reduced conductivity. When the volume fraction is more than 95%, the sheet becomes brittle, and it becomes difficult for the sheet to keep its sheet shape.

The hardness of the SE sheet is usually 65-96 in terms of ASTM A hardness. When the hardness is less than 65, the conductivity of the sheet is reduced. When the hardness is more than 96, the flexibility of the sheet becomes poor, and the sheet becomes brittle.

The thickness of the SE sheet is preferably 10-250 $\mu m$. When the thickness is less than 10 $\mu m$, the resulting sheet is easy to tear and it is difficult for the sheet to keep its sufficient strength. When the thickness is larger than 250 $\mu m$, the sheet tends to have a reduced conductivity.

The SE sheet can be produced, for example, by adding to a solvent a raw material for the SE sheet consisting of 55-95% (by volume fraction) of a solid electrolyte powder and 5-45% (by volume fraction) of an insulating elastomer, coating the resulting mixture on a substrate and drying the coated substrate.

In the production of the SE sheet, the order of addition of the solid electrolyte powder, the insulating elastomer and the solvent is not critical, but in order to improve the uniformity of the resulting mixture with solvent, the insulating elastomer is dissolved in the solvent and the resulting insulating elastomer solution is kneaded with the solid electrolyte powder using a mixer of high shear force such as ball mill, homogenizer or the like. The resulting mixture is rolled on a substrate by an applicator bar or the like and the solvent is removed by drying, thereby obtaining a SE sheet (referred to hereinafter as "SE Sheet I"). In this case, the solid concentration of the mixture with the solvent is preferably 50–80% by weight. The above process for the production of the SE Sheet I is preferred because a thin film of 100 $\mu$m or less with slight variations in thickness can be obtained, the heat generation during kneading is low, so that deterioration and decomposition of the solid electrolyte powder hardly occurs, substantially no contact with the atmosphere takes place during kneading, so that deterioration and decomposition of the solid electrolyte powder due to moisture and oxygen hardly occurs, and therefore, the measures for the work environment are easy.

The solvent used in the above production process includes, for example, saturated hydrocarbon solvents, aromatic hydrocarbon solvents, halogenated hydrocarbon solvents and ester type solvents, all of which have no water absorbability and no reactivity with the solid electrolyte powder. Examples of such solvents are n-hexane, n-heptane, n-octane, cyclohexane, benzene, toluene, xylene, ethyl acetate, trichloroethylene and the like. Incidentally, these solvents preferably have a boiling point in a range of 70–150° C. When the boiling point is lower than 70° C., the evaporation rate of the solvent in the mixture is too rapid and it is impossible in some cases to obtain a uniform sheet of large area. When the boiling point is higher than 150° C., the evaporation rate of the solvent is slow and the productivity of the sheet becomes low in some cases.

The SE sheet is preferably produced by applying a mixture consisting of the solid electrolyte powder and the insulating elastomer, to the openings of a non-conductive reticulate material to fill the openings with the mixture.

The method of filling the openings of the non-conductive reticulate material with the mixture includes a method comprising impregnating a non-conductive reticulate material with a formulation of the mixture plus solvent mentioned above to sufficiently adhere the formulation to the reticulate material and then, by means of blades, roll or the like, filling the openings of the reticulate material with the formulation and simultaneously removing the excessive formulation.

Thus, the openings of a non-conductive reticulate material are filled with the formulation and then the formulation is dried at a temperature of, for example, 20–30° C., thereby obtaining a SE sheet in which the openings of a non-conductive reticulate material are filled with a mixture of a solid electrolyte powder and an insulating elastomer.

The non-conductive reticulate material can be made of, for example, cellulose, nylon 6, nylon 66, polypropylene, polyethylene, polyester, glass fiber or the like. Specific examples of the non-conductive reticulate material are woven or nonwoven fabrics made of the above raw materials. The proportion of openings of the non-conductive reticulate material is suitably 35–65%. Incidentally, the proportion of openings is defined as the total area of the openings per unit area of the reticulate material. When the proportion is less than 35%, the SE sheet obtained has a low conductivity. When the proportion exceeds 65%, the SE sheet has an insufficient strength in some cases.

The specific surface area of the non-conductive reticulate material is suitably 50–1,000 m$^2$/g. In the case of nonwoven fabric, its weight per unit area is suitably 5–50 g/m$^2$. The thickness of the non-conductive reticulate material is preferably 10–150 $\mu$m, given the strength requirements of the reticulate material itself and the purpose of producing a thinner solid electrolyte sheet. The average area per single opening is preferably $1.6 \times 10^{-3}$–$9 \times 10^{-2}$ mm$^2$ and the distance between adjacent openings is preferably 20–120 $\mu$m.

When the SE sheet is obtained by filling the openings of a non-conductive reticulate material with a mixture of a solid electrolyte powder and an insulating elastomer, the SE sheet preferably has two layers of the mixture having a thickness of 5–25 $\mu$m, one formed on each side of the reticulate material, in order to increase the adhesion to an electrode sheet or metal sheet which will be mentioned hereinafter and also to increase the conductivity. As stated above, the SE sheet preferably has a thickness of 10–250 $\mu$m.

The SE sheet obtained by filling the openings of a non-conductive reticulate material with a mixture of a solid electrolyte powder and an insulating elastomer (referred to hereinafter as "SE Sheet II"), has very good thickness precision because it uses a non-conductive reticulate material as a matrix.

The SE sheet can also be obtained by other processes than the one mentioned above. Other processes include kneading an insulating elastomer and a solid electrolyte powder by, for example, a biaxial kneader and then rolling the resulting mixture into a sheet.

In order to increase the adhesion of the SE sheet to an electrode sheet or a metal sheet, the mixture may further contain a rosin-based, aromatic compound-based or terpene-based tackifier such as a modified rosin, a rosin derivative, a terpene resin, a coumarone-indene resin, a phenol-modified coumarone-indene resin or the like.

The steps in the SE sheet production are preferably carried out with a relative humidity is 30% or less. When the relative humidity exceeds 30%, the solid electrolyte powder may be deteriorated.

Using the SE sheet thus obtained, a structure can be produced a structure (referred to hereinafter as "Structure I") consisting essentially of (i) the SE sheet sandwiched in between (ii) a pair of electrode sheets, each of contain an electrode active substance powder and the like dispersed in an insulating elastomer in a specific volume fraction; a pair of metal sheets, or an electrode sheet as mentioned above and a metal sheet. As well, a structure (referred to hereinafter as "Structure II") consisting essentially of (i) the SE sheet sandwiched in between (ii) a pair of electrode sheets, a pair of metal sheets, or an electrode sheet and a metal sheet, wherein at least one of these sheets is a sheet-shaped product obtained by filling the openings of the reticulate material with the mixture obtained by, either when said sheet is the SE sheet, dispersing a solid electrolyte powder containing the specific solid electrolyte powder in an insulating elastomer, or by, when said sheet is the electrode sheet, dispersing an electrode active substance powder and others in an insulating elastomer.

Each of Structures I and II is composed, basically, of the SE sheet and a pair of electrode sheets, a pair of metal sheets, or an electrode sheet and a metal sheet, and is obtained by piling up them in the order of the electrode or metal sheet, the SE sheet and the electrode or metal sheet and subjecting the resulting assembly to integral molding. The method of the integral molding is not critical; however, the integral molding can be carried out, for example, by heating the assembly under pressure at a temperature of about 100-150° C. for about several tens of seconds to 10 minutes in an inert gas atmosphere. After the heating under pressure, the assembly may be subjected to a heat treatment for about 1-3 hours in an inert gas in order to make the adhesion uniform. Structures I and II can be produced easily and have a thin shape with a large surface area.

Each of Structures I and II may be practically used as an electrochemical element after applying, if necessary, collective electrodes onto both sides of the structure and then sealing the resulting assembly by a simple sealing technique, such as sealing with a resin, for example, an epoxy resin or the like, or laminate-sealing with a polyethylene film, a polypropylene film or the like.

The electrode sheet used in the structures is obtained by dispersing an electrode active substance powder or a mixture of an electrode active substance powder and a solid electrolyte powder in an insulating elastomer at a volume fraction of 50-95%, preferably 75-95% (referred to hereinafter as "Electrode Sheet I"). When the volume fraction of the electrode active substance powder or the mixture of an electrode active substance powder and a solid electrolyte powder is less than 50%, the electrical contact of the electrode active substance powder or the mixture of an electrode active substance powder and a solid electrolyte powder in Electrode Sheet I with the solid electrolyte powder in the SE sheet is insufficient, whereby it becomes difficult for the resulting structure to possess satisfactory properties as an electrochemical element. When the volume fraction is more than 95%, the resulting electrode sheet is brittle and it is difficult for the electrode sheet to retain the sheet shape.

The electrode active substance used in the electrode sheet includes carbon materials such as graphite, acetylene black, activated carbon and the like; metal sulfides such as titanium sulfide, niobium sulfide, molybdenum sulfide, copper sulfide, silver sulfide, lead sulfide, silver Chevrel, copper Chevrel, iron sulfide and the like; metal oxides such as tungsten oxide, vanadium oxide, chromium oxide, molybdenum oxide, titanium oxide, iron oxide, silver oxide, copper oxide and the like; metal halides such as silver chloride, lead iodide, copper iodide and the like; and metals such as copper, silver, lithium, gold, platinum, titanium, alloys of these metals, stainless steel and the like. These substances are appropriately selected depending upon the purposes of application of Structures I and II.

Among these electrode active substances, substances which can electrochemically give ions to and receive ions from the solid electrolyte, for example, metal sulfides such as titanium sulfide, niobium sulfide, molybdenum sulfide, copper sulfide, silver sulfide, lead sulfide, silver Chevrel, copper Chevrel, nickel Chevrel, iron sulfide and the like, and metal oxides such as tungsten oxide, vanadium oxide, chromium oxide, molybdenum oxide, titanium oxide and the like are suitable for positive electrode sheets of solid microcells. Substances which can electrochemically give ions and receive ions from the solid electrolyte to undergo optical change, for example, tungsten oxide and the like are suitable for the electrode sheet of a solid electrochromic display. Substances which do not give ions to or receive ions from the solid electrolyte but can form an electric double layer at the interface between the electrode active substance and the solid electrolyte, for example, activated carbon and the like, are appropriate for the electrode sheet of a solid double layer capacitor.

When the electrode sheet contains both the electrode active substance powder and the solid electrolyte powder, the ratio of the electrode active substance powder to the solid electrolyte powder is preferably ½ to 5/4 (by weight).

The shape and particle diameter of the electrode active substance powder are not critical and it is preferable in view of, for example, the miscibility with the insulating elastomer that the electrode active substance powder can pass through a 100-200 mesh (Tyler) screen.

In the above electrode sheet, the insulating elastomer may be the same as used in the SE sheet.

The process for the production of Electrode Sheet I includes, for example, a process comprising kneading an insulating elastomer with a solid electrolyte powder, an electrode active substance powder, etc. with a Banbury mixer or the like and then rolling the resulting mixture into a sheet, and a process comprising dissolving an insulating elastomer in a solvent to obtain an elastomer solution having a solid concentration of preferably 50-80% by weight, kneading the elastomer solution with a solid electrolyte powder, an electrode active substance powder and the like in a ball mill or the like, rolling the resulting mixture plus solvent by means of an applicator bar or the like and removing the solvent by drying. The latter process is preferably because a thin film of 100 μm or less in thickness having slight thickness variations can be obtained easily, the heat generation during kneading is low and accordingly deterioration and decomposition of the solid electrolyte powder barley occurs. Substantially no contact with air takes place during kneading, and therefore, deterioration and decomposition of the solid electrolyte powder due to moisture, oxygen, etc. hardly occur.

Electrode Sheet I can be used also as an electrode sheet for Structure II.

As the metal sheet, sheets made of lithium, a lithium-aluminum alloy, tungsten trioxide or the like can be used. The metal sheet can be a vapor deposition film formed on the SE sheet. The thickness of the metal sheet is usually 10-200 μm.

Structure II consists essentially of (i) the SE sheet sandwiched in between (ii) a pair of electrode sheets, a pair of metal sheets, or an electrode sheet and a metal sheet, wherein at least one of these sheets is selected from the following sheet-shaped product: When the sheet is the SE sheet, it is SE Sheet II mentioned above; and when the sheet is the electrode sheet, it is obtained by filling the openings of a reticulate material with a mixture obtained by dispersing at least an electrode active substance powder in an insulating elastomer (referred to hereinafter as "Electrode Sheet II"). In order for Electrode Sheet II to have a lower interfacial resistance at the interface with the SE sheet to facilitate the movement of charges at the interface, it is preferable to use a mixture of an electrode active substance powder and a solid electrolyte powder in the production of Electrode Sheet II.

The process for the production of Electrode Sheet II includes, for example, a process comprising immersing a reticulate material in a slurry obtained by dispersing a solid electrolyte powder, an electrode active substance powder and an insulating elastomer in a solvent, to sufficiently adhere the slurry to the reticulate material and then filling the openings of the reticulate material with the slurry by blade, roll or the like and simultaneously removing the excessive slurry adhering to the reticulate material. In this case, the solid concentration of the slurry is preferably 50–80% by weight. Thus, the openings of the reticulate material are filled with the mixture of the electrode active substance powder and the insulating elastomer and the resulting reticulate material is dried at a temperature of, for example, 20–30° C., preferably in an inert gas atmosphere. In order to improve the adhesion to the SE sheet, the conductivity, the polarization, the capacity, etc., Electrode Sheet II preferably comprises (1) a reticulate material and (2) a layer of the mixture formed on one side of the reticulate material or a pair of layers of the mixture formed on both sides of the reticulate material, each layer having a thickness of 5–25 $\mu$m.

According to the above process, Electrode Sheet II can be produced with a very high thickness precision because it uses a reticulate material as a matrix, and can be obtained continuously.

The reticulate material used in Electrode Sheet II may be the same as used in the production of SE Sheet II, and may also be a conductive reticulate material.

In Structures I and II, the solid electrolyte powder and the insulating elastomer contained in the SE sheet may be identical with or different from those contained in the electrode sheet. However, in view of the homogeneousness of the shaped article, the adhesion between the SE sheet and the electrode sheet and other aspects, they are preferably common to both Structures I and II.

In Structure II, it is sufficient that at least one of the SE sheet and the electrode sheets is a sheet in which the reticulate material is used.

$LiTi_2(PO_4)_3$ is a lithium ion-conductive solid electrolyte having a three-dimensional network structure, but is unable to give a sintered material of high density and has a low lithium ion-conductivity. However, the lithium ion-conductive Solid Electrolytes I and II of this invention which are obtained by substituting a trivalent metal ion such as $Fe^{3+}$, $Al^{3+}$ or rare earth element ions for $Ti^{4+}$ or $Si^{4+}$ for $P^{5+}$ to increase $Li^+$ mobility, can give a sintered material of very high density. That is, $LiTi_2(PO_4)_3$ cannot become a sintered material of high density even when sintered at fairly high temperatures and the sintered material has a very large porosity of about 34%. Additionally, when the Solid Electrolytes I and II of this invention have been sintered, the porosity decreases significantly to 5% or less, the density increases greatly and the conductivity increases with an increase in the amount of trivalent metal ion such as $Fe^{3+}$, $Al^{3+}$ or rare earth element ions or $Si^{4+}$.

FIG. 1 shows a relationship between substitution amount x and conductivity $\sigma$ at 25° C. in the case of $Li_{1+x}M_xTi_{2-x}(PO_4)_3$. In FIG. 1, "○" refers to $LiTi_2(PO_4)_3$ (x=0), "●" to $Li_{1+x}Al_xTi_{2-x}(PO_4)_3$, "▲" to $Li_{1+x}Sc_xTi_{2-x}(PO_4)_3$, "□" to $Li_{1+x}Y_xTi_{2-x}(PO_4)_3$, "◇" to $Li_{1+x}La_xTi_{2-x}(PO_4)_3$ and "×" to $Li_{1+x}Fe_xTi_{2-x}(PO_4)_3$.

Figure 2:
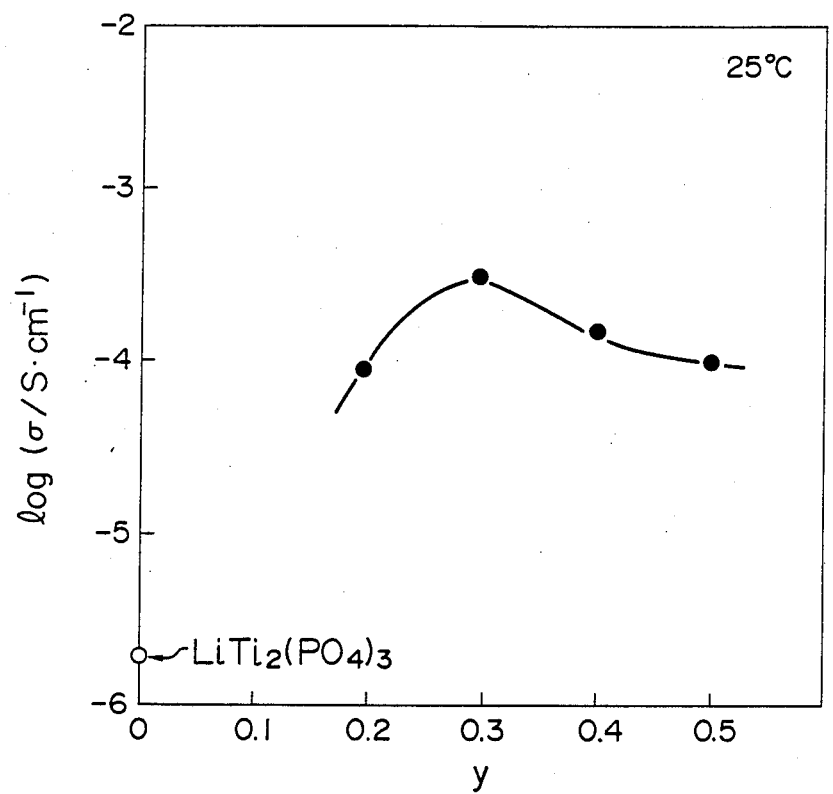
FIG. 2 is a graph showing a relationship between substitution amount y and ion-conductivity $\sigma$, in the lithium ion-conductive solid electrolyte of this invention represented by the chemical formula, $Li_{1+y}Ti_2Si_yP_{3-y}O_{12}$.

FIG. 2 shows a relationship between substitution amount y and conductivity $\sigma$ at 25° C., in $Li_{1+y}Ti_2Si_yP_{3-y}O_{12}$. In FIG. 2, "○" refers to $LiTi_2(PO_4)_3$ (y=0), and "●" $Li_{1+y}Ti_2Si_yP_{3-y}O_{12}$.

Solid Electrolyte III of this invention, similarly to Solid Electrolytes I and II of this invention, has a low porosity, a greatly improved density and accordingly an improved conductivity.

The novel lithium ion-conductive solid electrolyte of this invention has a high ion-conductivity at room temperature, high lithium ion transport number and a chemical stability.

The SE sheet of this invention in which the above novel lithium ion-conductive solid electrolyte is used is excellent in ion-conductivity, processability, productivity, storage stability and flexibility, as well as in adhesion an electrode active substance when a solid electrochemical element such as cell or the like is produced therefrom, and can be produced in a thin and large shape.

The structure of this invention in which the above SE sheet is employed is suitable for use as a solid cell characterized by high energy density, low self-discharge, etc. and is also useful as an electrochemical element such as an electrolyte sheet for solid microcell having a thickness of, for example, 1.0 mm or less (this thickness has conventionally been difficult to achieve), an electrochromic display element, an electric double layer capacitor or the like.

EXAMPLE 1

$TiO_2$, $Li_2CO_3$, $(NH_4)_2HPO_4$ and $Fe_2O_3$ were weighed so that the molar ratio of $TiO_2:Li_2CO_3:(NH_4)_2HPO_4: Fe_2O_3$ became 1.7:0.65:3:0.15.

Each of the above raw materials was vacuum-dried at room temperature in a desiccator containing $P_2O_5$ as a desiccant. They were mixed in a mortar to a powdery state. The resulting mixture in the powdery state was subjected to reaction at 900° C. for 2 hours in a platinum crucible placed in an electric furnace. The reaction mixture was cooled slowly and then ground in a ball mill for 6 hours. The ground product was vacuum-dried at 100° C. and subjected again to reaction at 900° C. for 2 hours in a platinum crucible placed in an electric furnace. The reaction mixture was cooled slowly and then ground in a ball mill for 12 hours.

The ground product was vacuum-dried at 100° C. A molding binder was added to the ground product a 3% (by weight) aqueous polyvinyl alcohol solution at a proportion of 0.1 ml per g of the ground product. To the resulting mixture pressure was applied (1 t/cm²) with a press to mold it into tablets of 10 mm in diameter and 1 mm in thickness. The molded product (tablets) was sintered at 1,100° C. for 2 hours on a platinum boat placed in an electric furnace. Elemental analysis confirmed that the sintered material was $Li_{1.3}Fe_{0.3}Ti_{1.7}(PO_4)_3$. Incidentally, the elemental analysis was conducted using fluorescent X-ray analysis and atomic absorption spectrometry.

The sintered material was measured also for total ion conductivity, lithium ion transport number and chemical stability by the following methods, and the results obtained are shown in Table 1: Total ion-conductivity: Measured by an AC method using gold vapor-deposited on both sides of a sintered material as electrodes and using an impedance meter. Lithium ion transport number: Determined by pinching a sintered material between two lithium plates, applying a DC voltage between the two plates while varying the voltage slowly from 0 V to 2 V, measuring the amount of electricity which passed between the lithium plates, and indicating as a ratio the DC conductivity obtained to the above total ion-conductivity. Chemical stability: Evaluated by allowing the sintered material to stand at 25° C. for 12 hours in air at 50% relative humidity and then measuring its total ion-conductivity.

EXAMPLE 2

A sintered material was obtained by repeating the same procedure as in Example 1, except that $TiO_2$, $Li_2CO_3$, $(NH_4)_2HPO_4$ and $Fe_2O_3$ were used at a molar ratio of $TiO_2:Li_2CO_3:(NH_4)_2HPO_4:Fe_2O_3$ of 1.6:0.70:3:0.20. Elemental analysis confirmed that the sintered material was $Li_{1.4}Fe_{0.4}Ti_{1.6}(PO_4)_3$.

The sintered material was tested in the same manner as in Example 1. The results obtained are shown in Table 1.

COMPARATIVE EXAMPLE 1

A sintered material was obtained by repeating the same procedure as in Example 1, except that $TiO_2$, $Li_2CO_3$ and $(NH_4)_2HPO_4$ were used so that the molar ratio of $TiO_2:Li_2CO_3:(NH_4)_2HPO_4$ was 2:0.5:3. Elemental analysis confirmed that the sintered material was $LiTi_2(PO_4)_3$.

2.7:0.3. Elemental analysis confirmed that the sintered material was $Li_{1.3}Ti_2SiO_{0.3}P_{2.7}O_{12}$.

The sintered material was tested in the same manner as in Example 1. The results obtained are shown in Table 1.

EXAMPLE 5

A sintered material was obtained by repeating the same procedure as in Example 1, except that $TiO_2$, $Li_2CO_3$, $(NH_4)_2HPO_4$ and $SiO_2$ were used at a molar ratio of $TiO_2:Li_2CO_3:(NH_4)_2HPO_4:SiO_2$ of 2:0.7:2.6:0.4. Elemental analysis confirmed that the sintered material was $Li_{1.4}Ti_2Si_{0.4}P_{2.6}O_{12}$.

The sintered material was tested in the same manner as in Example 1. The results obtained are shown in Table 1.

EXAMPLE 6

A sintered material was obtained by repeating the same procedure as in Example 1, except that $TiO_2$, $Li_2CO_3$, $(NH_4)_2HPO_4$ and $SiO_2$ were used at a molar ratio of $TiO_2:Li_2CO_3:(NH_4)_2HPO_4:SiO_2$ of 2:0.75:2.5:0.5. Elemental analysis confirmed that the sintered material was $Li_{1.5}Ti_2Si_{0.5}P_{2.5}O_{12}$.

The sintered material was tested in the same manner as in Example 1. The results obtained are shown in Table 1.

TABLE 1

|  | Example 1 | Example 2 | Comparative Example 1 | Example 3 |
|---|---|---|---|---|
| Composition of solid electrolyte | $Li_{1.3}Fe_{0.3}Ti_{1.7}(PO_4)_3$ | $Li_{1.4}Fe_{0.4}Ti_{1.6}(PO_4)_3$ | $LiTi_2(PO_4)_3$ | $Li_{1.2}Ti_2Se_{0.2}P_{2.8}O_{12}$ |
| Total ion-conductivity ($Scm^{-1}$) (25° C.) | $2.5 \times 10^{-4}$ | $3.8 \times 10^{-4}$ | $2 \times 10^{-6}$ | $8.6 \times 10^{-5}$ |
| Lithium ion transport number (%) | 100 | 100 | 100 | 100 |
| Chemical stability ($Scm^{-1}$) | $2.5 \times 10^{-4}$ | $3.8 \times 10^{-4}$ | $2 \times 10^{-6}$ | $8.6 \times 10^{-5}$ |

|  | Example 4 | Example 5 | Example 6 |
|---|---|---|---|
| Composition of solid electrolyte | $Li_{1.3}Ti_2Si_{0.3}P_{2.7}O_{12}$ | $Li_{1.4}Ti_2Si_{0.4}P_{2.6}O_{12}$ | $Li_{1.5}Ti_2Si_{0.5}P_{2.5}O_{12}$ |
| Total ion-conductivity ($Scm^{-1}$) (25° C.) | $3.2 \times 10^{-4}$ | $1.5 \times 10^{-4}$ | $9.6 \times 10^{-5}$ |
| Lithium ion transport number (%) | 100 | 100 | 100 |
| Chemical stability ($Scm^{-1}$) | $3.2 \times 10^{-4}$ | $1.5 \times 10^{-4}$ | $9.6 \times 10^{-5}$ |

The sintered material was tested in the same manner as in Example 1. The results obtained are shown in Table 1.

EXAMPLE 3

A sintered material was obtained by repeating the same procedure as in Example 1, except that $TiO_2$, $Li_2CO_3$, $(NH_4)_2HPO_4$ and $SiO_2$ were used at a molar ratio of $TiO_2:Li_2CO_3:(NH_4)_2HPO_4:SiO_2$ of 2:0.6:2.8:0.2. Elemental analysis confirmed that the sintered material was $Li_{1.2}Ti_2Si_{0.2}P_{2.8}O_{12}$.

The sintered material was tested in the same manner as in Example 1. The results obtained are shown in Table 1.

EXAMPLE 4

A sintered material was obtained by repeating the same procedure as in Example 1, except that $TiO_2$, $Li_2CO_3$, $(NH_4)_2HPO_4$ and $SiO_2$ were used at a molar ratio of $TiO_2:Li_2CO_3:(NH_4)_2HPO_4:SiO_2$ of 2:0.65:

EXAMPLE 7

$TiO_2$, $Li_2CO_3$ and $(NH_4)_2HPO_4$ were weighed so that the molar ratio of $TiO_2:Li_2CO_3:(NH_4)_2HPO_4$ became 2:0.5:3.

Each of the above raw materials was vacuum-dried at room temperature in a desiccator containing $P_2O_5$ as a desiccant. They were mixed in a mortar to a powdery state. The resulting mixture in the powdery state was subjected to reaction at 900° C. for 2 hours in a platinum crucible placed in an electric furnace. The reaction mixture was cooled slowly and then ground in a ball mill for 6 hours. The ground product was vacuum-dried at 100° C. and subjected again to reaction at 900° C. for 2 hours in a platinum crucible placed in an electric furnace. The reaction mixture was cooled slowly and then ground in a ball mill for 12 hours.

Elemental analysis confirmed that the ground product was a compound represented by $LiTi_2(PO_4)_3$.

$Li_2O$ was added to the ground product so that the molar ratio of $LiTi_2(PO_4)_3:Li_2O$ became 1:0.2. They were mixed in a mortar. To the resulting mixture a molding binder was added, of a 3% (by weight) aqueous polyvinyl alcohol solution at a proportion of 0.1 ml per g of the mixture. To the resulting mixture pressure was applied (1 t/cm$^2$) with a press to mold it into tablets of 10 mm in diameter and 1 mm in thickness. The molded product (tablets) was sintered at 950° C. for 2 hours on a platinum boat placed in an electric furnace.

The porosity of the sintered material obtained was determined by calculating the volume (calculated value) from the weight of the sintered material. The theoretical density of the sintered material determined by X-ray analysis, and the calculated value and the actually measured volume (found value) were compared.

The sintered material was also tested in the same manner as in Example 1. The results obtained are shown in Table 2.

EXAMPLE 8

A sintered material was obtained by repeating the same procedure as in Example 7, except that $Li_2O$ was added so that the molar ratio of $LiTi_2(PO_4)_3:Li_2O$ became 1:0.3.

The sintered material was tested in the same manner as in Example 1. The results obtained are shown in Table 2.

EXAMPLE 9

A sintered material was obtained by repeating the same procedure as in Example 7, except that $Li_4P_2O_7$ was added in place of $Li_2O$ so that the molar ratio of $LiTi_2(PO_4)_3:Li_4P_2O_7$ became 1:0.1. The sintered material was tested in the same manner as in Example 1. The results obtained are shown in Table 2.

EXAMPLE 11

A sintered material was obtained by repeating the same procedure as in Example 1, except that $TiO_2$, $Li_2CO_3$, $(NH_4)_2HPO_4$ and $La_2O_3$ were used at a molar ratio of $TiO_2:Li_2CO_3:(NH_4)_2HPO_4:La_2O_3 = 1.7:0.65:3:0.15$ and the sintering temperature was changed to 1,200° C. Elemental analysis confirmed that the sintered material was $Li_{1.3}La_{0.3}Ti_{1.7}(PO_4)_3$. The sintered material was tested in the same manner as in Example 1. The results obtained are shown in Table 3.

EXAMPLE 12

A sintered material was obtained by repeating the same procedure as in Example 1, except that $TiO_2$, $Li_2CO_3$, $(NH_4)_2HPO_4$ and $Y_2O_3$ were used at a molar ratio of $TiO_2:Li_2CO_3:(NH_4)_2HPO_4:Y_2O_3 = 1.6:0.7:3:0.2$ and the sintering temperature was changed to 1,200° C. Elemental analysis confirmed that the sintered material was $Li_{1.4}Y_{0.4}Ti_{1.6}(PO_4)_3$. The sintered material was tested in the same manner as in Example 1. The results obtained are shown in Table 3.

EXAMPLE 13

A sintered material was obtained by repeating the same procedure as in Example 1, except that $TiO_2$, $Li_2CO_3$, $(NH_4)_2HPO_4$ and $Sc_2O_3$ were used at a molar ratio of $TiO_2:Li_2CO_3:(NH_4)_2HPO_4:Sc_2O_3 = 1.8:0.6:3:0.1$ and the sintering temperature was changed to 1,200° C. Elemental analysis confirmed that the sintered material was $Li_{1.2}Sc_{0.2}Ti_{1.8}(PO_4)_3$. The sintered material was tested in the same manner as in Example 1. The results obtained are shown in Table 3.

TABLE 3

| | Example 10 | Example 11 | Example 12 | Example 13 |
|---|---|---|---|---|
| Composition of solid electrolyte | $Li_{1.3}Al_{0.3}Ti_{1.7}(PO_4)_3$ | $Li_{1.3}La_{0.3}Ti_{1.7}(PO_4)_3$ | $Li_{1.4}Y_{0.4}Ti_{1.6}(PO_4)_3$ | $Li_{1.2}Sc_{2.0}Ti_{1.8}(PO_4)_3$ |
| Total ion-conductivity (S cm$^{-1}$) (25° C.) | $7 \times 10^{-4}$ | $5 \times 10^{-4}$ | $6 \times 10^{-4}$ | $7 \times 10^{-4}$ |
| Lithium ion transport number (%) | 100 | 100 | 100 | 100 |
| Chemical stability (S cm$^{-1}$) | $7 \times 10^{-4}$ | $5 \times 10^{-4}$ | $6 \times 10^{-4}$ | $7 \times 10^{-4}$ | rial was tested in the same manner as in Example 1. The results obtained are shown in Table 2.

TABLE 2

| | Example 7 | Example 8 | Example 9 |
|---|---|---|---|
| Kind of additive | $Li_2O$ | $Li_2O$ | $Li_4P_2O_7$ |
| Amount of additive: Additive/$LiTi_2(PO_4)_3$ (mole %) | 0.2 | 0.3 | 0.1 |
| Porosity of sintered material (%) | 4.1 | 3.0 | 3.2 |
| Total ion-conductivity (S cm$^{-1}$) (25° C.) | $2.4 \times 10^{-4}$ | $3.6 \times 10^{-4}$ | $1.6 \times 10^{-4}$ |
| Lithium ion transport number (%) | 100 | 100 | 100 |
| Chemical stability (S cm$^{-1}$) | $2.4 \times 10^{-4}$ | $3.6 \times 10^{-4}$ | $1.6 \times 10^{-4}$ |

EXAMPLE 10

A sintered material was obtained by repeating the same procedure as in Example 1, except that $TiO_2$, $Li_2CO_3$, $(NH_4)_2HPO_4$ and $Al_2O_3$ were used at a molar ratio of $TiO_2:Li_2CO_3:(NH_4)_2HPO_4:Al_2O_3 = 1.7:0.65:3:0.15$ and the sintering temperature was changed to 1,200° C.. Elemental analysis confirmed that the sintered material was $Li_{1.3}Al_{0.3}Ti_{1.7}(PO_4)_3$.

The sintered material was tested in the same manner as in Example 1. The results obtained are shown in Table 3.

EXAMPLE 14–16 AND COMPARATIVE EXAMPLE 2–3

A SBS (TR-2000, a trade name of Japan Synthetic Rubber Co., Ltd. for a styrene-butadiene-styrene block copolymer, specific gravity=0.96) was dissolved in toluene to obtain an elastomer solution. A solid electrolyte powder represented by $Li_{1.3}Al_{0.3}Ti_{1.7}(PO_4)_3$ having particle diameters passing through a 200-mesh (Tyler) screen, obtained in Example 10 was added to the elastomer solution so that the volume fraction when toluene was removed became 60%, 80% or 90% (Example 14, 15 or 16, respectively), or 50% or 96% (Comparative Example 2 or 3, respectively). The resulting mixture was kneaded in a ball mill for 2 hours to formation of a mixture with solvent.

The formulation was rolled by an applicator bar on a Teflon sheet. The toluene was evaporated in dry air to obtain five different SE Sheets I.

EXAMPLES 17-19

Pellets of a SBS (TR-2000) were mixed with a solid electrolyte powder represented by $Li_{1.3}Al_{0.3}Ti_{1.7}(PO_4)_3$ having particle diameters passing through a 200-mesh (Tyler) screen, obtained in Example 10 so that the volume fraction of the latter became 60%, 80% or 90% (Example 17, 18 or 19, respectively). They were kneaded by a biaxial kneader at 110° C. for 30 minutes to obtain a mixture.

The mixture was rolled on a biaxial roll to obtain three different SE Sheets I.

EXAMPLES 20-22 AND COMPARATIVE EXAMPLES 4-5

A SBS (TR-2000) was dissolved in toluene to obtain an elastomer solution. A solid electrolyte powder represented by $Li_{1.3}Al_{0.3}Ti_{1.7}(PO_4)_3$ having particle diameters passing through a 200-mesh (Tyler) screen, obtained in Example 10 was added to the elastomer solution so that the volume fraction when toluene was removed became 60%, 80% or 90% (Example 20, 21 or 22, respectively), or 50% or 96% (Comparative Example 4 or 5, respectively). The resulting mixture was kneaded in a ball mill for 2 hours to obtain a mixture with solvent.

Figure 3:
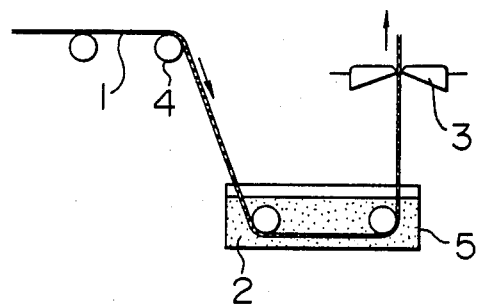
FIG. 3 is a diagrammatic view of the process for producing solid electrolyte sheets in Examples 20-25.
Figure 4:
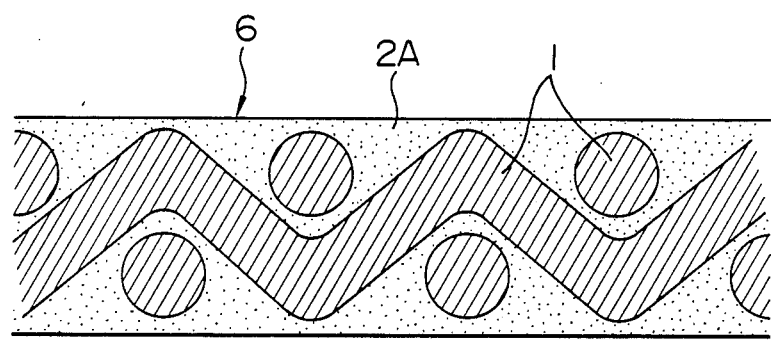
FIG. 4 is a sectional view of a solid electrolyte sheet obtained by the process of FIG. 3

The mixture with solvent was transferred to a vessel 5 for treatment as shown in FIG. 3. Then, the solid content in the mixture with solvent was adjusted to 58% by weight, 69% by weight or 78% by weight (Example 20, 21 or 22, respectively), or 55% by weight or 83% by weight (Comparative Example 5 or 6, respectively). Thereafter, a woven fabric 1 made of nylon 66, having an average area per opening of $5.5 \times 10^{-3}$ mm$^2$ and a distance between adjacent openings of 50 μm was immersed in the mixture with solvent in the vessel 5 to sufficiently adhere the mixture with solvent to the surface of the woven fabric 1. Subsequently, the woven fabric 1 was pinched by blades 3 and drawn from between the blades 3 while applying a sufficient forcing between the blades thereto, to fill the openings of the woven fabric 1 sufficiently with the mixture with solvent. The resulting sheet was sufficiently dried in a nitrogen stream to remove the solvent from the mixture, thereby obtaining five different solid electrolyte sheets 6 (SE Sheets II). The section of the SE Sheet II is shown in FIG. 4.

EXAMPLES 23-25 AND COMPARATIVE EXAMPLES 6-7

A SEBS (Kraton G-1650, a trade name of Shell for a styrene-ethylene-butylene-styrene block copolymer, specific gravity=0.92) and a SBS (TR-2000) were weighed so that their volume ratio became 8/2. They were dissolved together in toluene to obtain an elastomer solution. A solid electrolyte powder represented by $Li_{1.3}Al_{0.3}Ti_{1.7}(PO_4)_3$ having particle diameters passing through a 200-mesh (Tyler) screen, obtained in Example 10 was added to the elastomer solution so that the volume fraction when toluene was removed became 60%, 80% or 90% (Example 23, 24 or 25, respectively), or 50% or 96% (Comparative Example 6 or 7, respectively). They were kneaded in a ball mill for 2 hours to obtain a mixture with plus solvent.

The mixture with solvent was transferred to a vessel 5 for treatment as shown in FIG. 3. Then, the solid content in the mixture with plus solvent was adjusted to 58% by weight, 69% by weight or 79% by weight (Example 23, 24 or 25, respectively), or 55% by weight or 83% by weight (Comparative Example 6 or 7, respectively). The subsequent procedure was conducted in the same way as in Examples 20-22 to obtain five different SE sheets (SE Sheets II).

TEST EXAMPLE 1

The SE sheets obtained in Examples 14-25 and Comparative Examples 2-7 were evaluated by measuring their hardness, total conductivity, electron transport number and lithium ion transport number by the following methods to obtain the results shown in Table 4:

Hardness:

For the SE sheets obtained in Examples 14-19 and Comparative Examples 2-3, a SE sheet was folded to a thickness of about 1 mm and measured for ASTM A hardness on a glass plate.

For the SE sheets obtained in Examples 20-25 and Comparative Examples 4-7, a mixture of a solid electrolyte, an elastomer and a solvent was formed into a sheet using no woven fabric; the sheet was folded to a thickness of 1 mm and measured for ASTM A hardness on a glass plate.

Total conductivity:

A SE sheet was pinched by two platinum plates and a pressure of 10 kg/cm$^2$ was applied thereto at 130° C. for 5 minutes to adhere the SE sheet to the platinum plates. The total conductivity $\sigma_{total}$ of the SE sheet was determined from the real component of the impedance at an alternative current of 1 KHz measured by a LCR meter (YHP 4274A manufactured by Yokokawa Hewlett-Packard Company).

Electron transport number:

A SE sheet was pinched by two platinum plates and a pressure of 10 kg/cm$^2$ was applied thereto at 130° C. for 5 minutes to adhere the SE sheet to the platinum plates. The electron transport number of the SE sheet was determined by applying a DC voltage between the two plates while varying the voltage slowly from 0 V to 2 V, measuring the amount of electricity which passed between the platinum plates, and calculating the DC conductivity $\sigma_e$ and then the ratio of the DC conductivity $\sigma_e$ to the above total conductivity $\sigma$ total ($\sigma_e/\sigma$ total).

Lithium ion transport number:

The lithium ion transport number of a SE sheet was determined by pinching the SE sheet by two lithium plates, applying a DC voltage between the two plates while varying the voltage slowly from 0 V to 2 V, measuring the amount of electricity which passed between the lithium plates, and calculating the DC conductivity $\sigma_{Li}$ and then the ratio of the DC conductivity $\sigma_{Li}$ to the above total conductivity $\sigma_{total}$ ($\sigma_{Li}/\sigma_{total}$).

TEST EXAMPLE 2

The SE sheets obtained in Examples 14-25 and Comparative Examples 2-7 were examined for chemical stability by allowing a SE sheet to stand at 25° C. for 12 hours in air at 50% relative humidity and determining the total conductivity of the resulting SE sheet by the same method as mentioned above. The results are shown in Table 4.

TABLE 4

|  | Example 14 | Example 15 | Example 16 | Comparative Example 2 | Comparative Example 3 | Example 17 | Example 18 | Example 19 | Example 20 |
| --- | --- | --- | --- | --- | --- | --- | --- | --- | --- |
| Volume fraction of solid electrolyte powder (%) | 60 | 80 | 90 | 50 | 96 | 60 | 80 | 90 | 60 |
| Thickness of sheet ($\mu$m) | 42 | 58 | 72 | 40 | *1 | 120 | 170 | 210 | 62 |
| Hardness | 67 | 85 | 92 | 60 |  | 68 | 86 | 93 | 66 |
| Total conductivity (S cm$^{-1}$) | $1 \times 10^{-3}$ | $2 \times 10^{-3}$ | $3 \times 10^{-3}$ | $5 \times 10^{-7}$ |  | $4 \times 10^{-4}$ | $8 \times 10^{-4}$ | $1 \times 10^{-3}$ | $9 \times 10^{-4}$ |
| Electron transport number (%) | 0.01 | 0.01 | 0.01 | 0.05 |  | 0.05 | 0.05 | 0.05 | 0.03 |
| Lithium ion transport number (%) | 99.9 | 99.9 | 99.9 | 99.5 |  | 99.5 | 99.5 | 99.5 | 99.7 |
| Total conductivity after allowing to stand at 25° C. for 12 hours at a 50% relative humidity (S cm$^{-1}$) | $1 \times 10^{-3}$ | $2 \times 10^{-3}$ | $2.5 \times 10^{-3}$ | $5 \times 10^{-7}$ |  | $4 \times 10^{-4}$ | $8 \times 10^{-4}$ | $9 \times 10^{-4}$ | $8 \times 10^{-4}$ |

|  | Example 21 | Example 22 | Comparative Example 4 | Comparative Example 5 | Example 23 | Example 24 | Example 25 | Comparative Example 6 | Comparative Example 7 |
| --- | --- | --- | --- | --- | --- | --- | --- | --- | --- |
| Volume fraction of solid electrolyte powder (%) | 80 | 90 | 50 | 96 | 60 | 80 | 90 | 50 | 96 |
| Thickness of sheet ($\mu$m) | 68 | 72 | 60 | *1 | 75 | 88 | 100 | 70 | *1 |
| Hardness | 83 | 91 | 59 |  | 68 | 85 | 93 | 61 |  |
| Total conductivity (S cm$^{-1}$) | $1 \times 10^{-3}$ | $2 \times 10^{-3}$ | $3 \times 10^{-7}$ |  | $8 \times 10^{-4}$ | $1 \times 10^{-3}$ | $3 \times 10^{-3}$ | $9 \times 10^{-7}$ |  |
| Electron transport number (%) | 0.03 | 0.04 | 0.06 |  | 0.001 | 0.002 | 0.001 | 0.004 |  |
| Lithium ion transport number (%) | 99.7 | 99.6 | 99.4 |  | 99.9 | 99.9 | 99.9 | 99.9 |  |
| Total conductivity after allowing to stand at 25° C. for 12 hours at a 50% relative humidity (S cm$^{-1}$) | $1 \times 10^{-3}$ | $1.5 \times 10^{-3}$ | $3 \times 10^{-7}$ |  | $8 \times 10^{-4}$ | $1 \times 10^{-3}$ | $2 \times 10^{-3}$ | $9 \times 10^{-7}$ |  |

Note:
*1 Measurements were impossible because a mixture of a solid electrolyte powder and an elastomer turned into small pieces after the mixture had been applied onto a sheet or a woven fabric.

EXAMPLE 26

(1) A SE sheet (SE Sheet I) of 20 $\mu$m in thickness was obtained by repeating the same procedure as in Example 14.

(2) An electrode active substance powder $Cu_3Mo_6S_{7.8}$ and a solid electrolyte powder $Li_{1.3}Al_{0.3}Ti_{1.7}(PO_4)_3$ obtained in Example 10 were mixed at a weight ratio of $Cu_3Mo_6S_{7.8}:Li_{1.3}Al_{0.3}Ti_{1.7}(PO_4)_3 = 1:1$ in a mortar in an argon gas atmosphere for 1 hour to obtain a positive electrode powder. This positive electrode powder and a SBS (TR-2000) were kneaded and molded in the same manner as in Example 10 to obtain Positive Electrode Sheet I having a volume fraction of 90% of positive electrode powder and a thickness of 45 $\mu$m.

(3) Positive Electrode Sheet I, SE Sheet I and a metal sheet consisting of lithium and having a thickness of 45 $\mu$m were piled up in this order to obtain a laminate. To both sides of the laminate a stainless steel foil was attached as collective electrodes. The resulting assembly was press-molded at 150° C. and the peripheral portions were sealed with an epoxy resin to obtain a solid microcell (Structure I).

Figure 5:
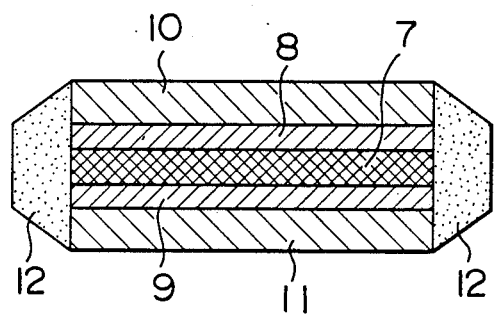
FIG. 5 is a sectional view of a solid electrolyte cell according to Example 26 of this invention.

The section of the Structure I is shown in FIG. 5. In FIG. 5, 7 refers to SE Sheet I, 8 to Positive Electrode Sheet I, 6 is a negative electrode metal sheet, 10 and 11 are collective electrodes, and 12 is a sealing material.

The thickness, total conductivity and discharge test result of the above solid microcell are shown in Table 5.

Incidentally, the total conductivity (S/cm) was determined from the real part of the impedance at an alternative current of 1 KHz measured by a LCR meter (YHP 4274A manufactured by Yokokawa Hewlett-Packard Company).

The discharge test was conducted at room temperature (25° C.) and a low temperature (−20° C.). The microcell was discharged at a current density of 0.5 mA/cm$^2$ and an energy density per unit weight of $Cu_3Mo_6S_{7.8}$ was measured when the final voltage was taken at 1 V.

EXAMPLE 27

(1) A SBS (TR-2000) was dissolved in toluene to obtain an elastomer solution. A solid electrolyte powder consisting of $Li_{1.3}Al_{0.3}Ti_{1.7}(PO_4)_3$ obtained in Example 10 was added to the elastomer solution. The mixture was kneaded in a ball mill for 2 hours. The kneaded product was transferred to a vessel and the solid content of the product was adjusted to 79% by weight. Using the resulting product, a polyester woven fabric having a thickness of 50 $\mu$m, an average area per opening of $5.5 \times 10^{-3}$ mm$^2$ and a distance between adjacent openings of 50 $\mu$m was subjected to the same treatment as in Examples 23–25 to obtain SE Sheet II containing a solid electrolyte powder in a volume fraction (in the mixture) of 90% and having a thickness of 70 $\mu$m.

(2) By repeating the same procedure as in Example 26 (2), Positive Electrode Sheet I' having a thickness of 70 $\mu$m was obtained.

(3) Positive Electrode Sheet I', SE Sheet II and a metal sheet consisting of lithium and having a thickness of 70 $\mu$m were piled up in this order to obtain a laminate. To both sides of the laminate a stainless steel foil was attached as collective electrodes. The resulting assembly was press-molded at 150° C. and the peripheral portions were sealed with an epoxy resin to obtain a solid microcell (Structure II). The thickness, total conductivity and discharge test result of the solid microcell are shown in Table 5.

TABLE 5

|  | Example 26 | Example 27 |
| --- | --- | --- |
| Thickness of cell (mm) | 0.21 | 0.3 |
| Total conductivity (S/cm) | $1.5 \times 10^{-3}$ | $1.3 \times 10^{-3}$ |
| Discharge capacity (Wh/kg) |  |  |
| (25° C.) | 480 | 470 |
| (−20° C.) | 480 | 470 |

It will be understood that the above description of the present invention is susceptible to various modifications, changes and adaptations, and the same are intended to be comprehended within the meaning and range of equivalents of the appended claims.

What is claimed is:

1. A lithium ion-conductive solid electrolyte selected from the group consisting of:
    a compound represented by the chemical formula, $Li_{1+x}M_xTi_{2-x}(PO_4)_3$, wherein M is at least one element selected from the subgroup consisting of Fe, Al Sc, Y, La and the rare earth elements, and wherein x is a number from 0.1 to 1.9;
    a compound represented by the chemical formula, $Li_{1+y}Ti_2Si_yP_{3-y}O_{12}$, wherein y is a number from 0.1 to 2.9; and
    a compound obtained by mixing a compound represented by the chemical formula, $LiTi_2(PO_4)_3$ with a lithium compound other than $LiTi_2(PO_4)_3$, and sintering the resulting mixture.

2. A lithium ion-conductive solid electrolyte according to claim 1, consisting of a compound represented by the chemical formula, $Li_{1+x}M_xTi_{2-x}(PO_4)_3$ M is at least one element selected from the group consisting of Fe, Al and rare earth elements and x is 0.1 to 1.9.

3. A lithium ion-conductive solid electrolyte according to claim 1, consisting of a compound represented by the chemical formula, $Li_{1+y}Ti_2Si_yP_{3-y}O_{12}$ y is a number of 0.1 to 2.9.

4. A lithium ion-conductive solid electrolyte according to claim 1, consisting of a compound obtained by mixing a compound represented by the chemical formula, $LiTi_2(PO_4)_3$ with a lithium compound other than $LiTi_2(PO_4)_3$ and sintering the resulting mixture.

5. A lithium ion-conductive solid electrolyte sheet comprising (a) a solid electrolyte of powder containing a lithium titanium phosphate and (b) an insulating elastomer, wherein the solid electrolyte powder (a) is uniformly dispersed in the insulating elastomer (b) in a volume fraction of 55-95%.

6. A lithium ion-conductive solid electrolyte sheet comprising (a) a non-conductive reticulate material and (b) a mixture obtained by dispersing 55-95%, by volume fraction of a solid electrolyte powder containing a lithium titanium phosphate and 5-45%, by volume fraction, of an insulating elastomer, wherein the openings of the non-conductive reticulate material (a) are filled with the mixture (b).

* * * * *